United States Patent
D'Angelo, Jr.

(10) Patent No.: US 9,545,974 B2
(45) Date of Patent: Jan. 17, 2017

(54) WIND SAIL SYSTEM FOR A VELOCIPEDE

(76) Inventor: Frank Emanueli D'Angelo, Jr., Haleiwa, HI (US)

( * ) Notice: Subject to any disclaimer, the term of this patent is extended or adjusted under 35 U.S.C. 154(b) by 5 days.

(21) Appl. No.: 12/931,897

(22) Filed: Feb. 15, 2011

(65) Prior Publication Data

US 2012/0205889 A1    Aug. 16, 2012

(51) Int. Cl.
*B62M 23/02*    (2010.01)
*B62B 15/00*    (2006.01)
*B62K 17/00*    (2006.01)
*B62M 1/20*    (2006.01)

(52) U.S. Cl.
CPC .......... *B62M 23/02* (2013.01); *B62B 15/005* (2013.01); *B62K 17/00* (2013.01); *B62M 1/20* (2013.01)

(58) Field of Classification Search
CPC .... B62B 15/001; B62B 15/004; B62B 15/005; B63H 9/06; B63H 9/0635; B63H 9/08; B62M 23/02; B62K 17/00
USPC .... 280/213, 214, 288.4; 114/102.16, 102.18, 114/102.21
See application file for complete search history.

(56) References Cited

U.S. PATENT DOCUMENTS

| | | |
|---|---|---|
| 578,411 A | 3/1897 | Lotherington |
| 639,107 A | 12/1899 | Sorensen |
| 947,731 A | 1/1910 | Couder |
| 2,038,166 A | 4/1936 | Deal |
| 2,443,565 A | 6/1948 | Land |
| 3,545,790 A * | 12/1970 | Davis et al. ............... 280/288.4 |
| 3,572,740 A * | 3/1971 | Rypinski ..................... 280/16 |
| 3,690,721 A * | 9/1972 | Herbert et al. ............. 296/78.1 |
| 3,836,176 A | 9/1974 | Ylvisaker |
| 3,986,722 A | 10/1976 | Patterson |
| 3,994,508 A | 11/1976 | Danner |
| 4,332,395 A * | 6/1982 | Zech ........................... 280/213 |
| 4,408,772 A * | 10/1983 | Hollwarth ...................... 280/1 |
| 4,441,728 A | 4/1984 | Schroeder |
| 4,557,495 A * | 12/1985 | Kindermann ................ 280/213 |
| 4,735,429 A * | 4/1988 | Beck ..................... B62B 15/005 |
| | | 114/102.24 |
| D303,235 S | 9/1989 | Allen |
| 5,806,451 A | 9/1998 | Carn |
| 5,971,414 A | 10/1999 | Borzage |
| 6,007,081 A * | 12/1999 | Merrill ..................... B63H 9/06 |
| | | 280/213 |
| 6,932,368 B1 * | 8/2005 | Zam ...................... B62B 15/001 |
| | | 280/213 |
| 7,182,355 B1 * | 2/2007 | MacTaggart ................. 280/213 |
| 7,264,254 B1 * | 9/2007 | MacTaggart ................. 280/213 |
| 7,503,573 B2 * | 3/2009 | Finlaw et al. ............... 280/202 |
| 2003/0146615 A1 * | 8/2003 | Beckett ........................ 280/771 |

* cited by examiner

*Primary Examiner* — Joseph Rocca
*Assistant Examiner* — Maurice Williams
(74) *Attorney, Agent, or Firm* — Ash Tankha; Lipton, Weinberger & Husick

(57) ABSTRACT

A sail system for a velocipede uses a swinging gate that pivots between a closed position, flush against the velocipede and an open position for sailing. A spring cord pulls the gate toward the open position while a control cord pulls the gate toward the closed position. A slide slidably disposed on a top tube controls positioning of the control cord and locks this cord in a particular position. A shield is also attached to the velocipede.

16 Claims, 3 Drawing Sheets

WIND SAIL SYSTEM FOR A VELOCIPEDE

BACKGROUND OF THE INVENTION

1. Field of the Invention

The present invention relates to a board holding implement that attaches to a velocipede so that the board acts as a sail in order to allow wind to help provide locomotive power to the velocipede.

2. Background of the Prior Art

The use of wind power to propel velocipedes is well known. A sail is attached to the velocipede, typically at the front or at the rear of the velocipede, so that the sail can harness the wind and help propel the velocipede, relieving the rider of some or even all of the pedaling effort needed for locomotion. Many varieties of such systems exist, however, they come with drawbacks.

Many velocipede based sail systems are unduly complex in design, attachment to the velocipede, and use, making such sail systems not only expensive to purchase and maintain, but also difficult to use and control, potentially sacrificing the ability to safely control the velocipede. Other systems, being front attached, prevent the rider from having a good view of the road ahead making driving tricky. Some front-based sails are attached to the handle bars of the velocipede making steering of the handle bars difficult especially in high wind load conditions.

A large portion of velocipede attached sails, especially rear mounted sails, take up an inordinate amount of real estate on the velocipede crowding the rider and making the rider uncomfortable during use. Additionally, the ability to store other items on the velocipede is compromised.

Numerous sails that are attached to a velocipede are essentially fixedly attached thereto. The sail is always present on the velocipede and cannot be removed without substantial effort. Replacement of such sails back onto the velocipede after being removed also entails a substantial effort. Accordingly, the rider has the sail present on the velocipede whether or not sail power is desired.

What is needed is a sail system that attaches to a velocipede in order to provide wind assisted locomotive power to the rider, wherein the sail system overcomes the above stated shortcomings currently found in the art. Specifically, such a sail system should be relatively simple in design and construction so that it is relatively inexpensive to manufacture, is easy to install, and is easy to maintain. Such a sail system should be easy to control while allowing the rider to have good vision of the road. Such a system should not compromise the velocipede's ability to haul cargo. Such a sail system should allow the sail to be readily demountable so that the rider can ride the velocipede without sail power as desired.

SUMMARY OF THE INVENTION

The wind sail system for a velocipede of the present invention addresses the aforementioned needs in the art by providing a relatively simple and effective sail system that quickly attaches a sail to and detaches the sail from a velocipede. The wind sail system for a velocipede is easy to control so that the rider has full control of the device as well as the velocipede to which the present invention is attached. The wind sail system for a velocipede not only provides cargo carrying capacity, but cargo storage is an inherent feature of the overall system. The wind sail system for a velocipede is of relatively simple design and construction being produced using standard manufacturing techniques.

The wind sail system for a velocipede of the present invention is comprised of a swinging frame member having an attachment board (can act as a minor sail or alternately may be the sport board (described below) which attaches directly to the swinging frame member) attached thereto. The swinging frame member is hingedly attached to the velocipede at an attachment point and is capable of swinging between a closed position with the front surface of the attachment board (and/or sport board) essentially flush against the velocipede and an open position with the front surface of the attachment board (and/or sport board) oriented essentially normal to the velocipede. A first pulley is attached to the velocipede rearward of the attachment point. A control cord has a first end attached to the swinging frame member or attachment board and also has a second end. The control cord passes over the first pulley such that pulling on the second end of the control cord pulls the swinging frame member toward and ultimately into the closed position. A resilient spring cord has a third end that is attached to the swinging frame member or to the attachment board and has a fourth end attached to the velocipede (directly or to a portion of the invention) forward of the attachment point such that the spring cord biases the swinging frame member toward the open position and actually swings the swinging frame member to the open position whenever the swinging frame member is not impeded from so swinging by the control cord. An optional second pulley is impaled by the head tube of the velocipede such that the control cord also passes over the second pulley. A lock slide is slidably disposed on a top tube of the velocipede and can be frictionally held stationary (locked) on the top tube such that the second end of the control cord is attached to the slide. The swinging frame member has an attachment strap thereon such that the sport board (major sail, mentioned previously and may be attached directly to swinging frame member thereby dispensing of the need for the attachment board) is attached to the swinging frame member and secured thereto via the attachment strap. A frame has a pair of attachment frame members, each attachment frame member attached to a respective one of the chains stays of the velocipede. The swinging frame member is attached to the velocipede via one of the attachment frame members. The frame also having a top plate onto which the first pulley is attached (the fourth end of the spring cord may be attached to the velocipede via the top plate). A shield is attached to the handle bar.

BRIEF DESCRIPTION OF THE DRAWINGS

Similar reference numerals refer to similar parts throughout the several views of the drawings.

DESCRIPTION OF THE PREFERRED EMBODIMENT

Figure 1:
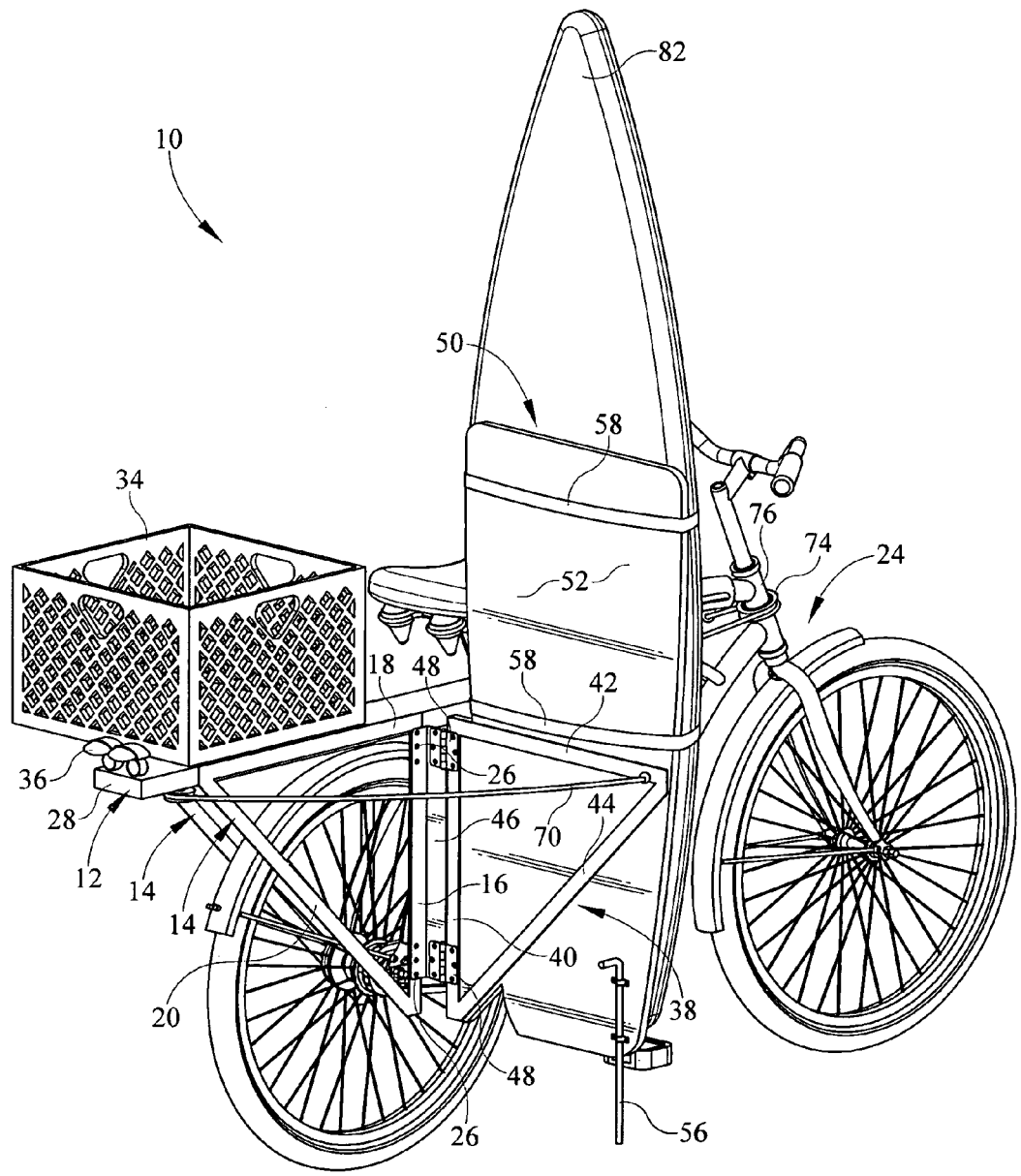
FIG. 1 is a perspective view of the wind sail system for a velocipede of the present invention with the sail mechanism in a deployed configuration.

Referring now to the drawings, it is seen that the wind sail system for a velocipede of the present invention, generally denoted by reference numeral 10, is comprised of a frame 12 that has a pair of generally triangular-shaped frame members 14, each frame member 14 having a vertical stay 16 and a horizontal stay 18, joined by a diagonal brace 20. Each frame member 14 is made from generally flat metal (or plastic) stock and each is attached to the chain stay 22 of a velocipede 24, one frame member 14 on each side of the velocipede 24 so that the two frame members 14 are parallel with one another. Each frame member 14 is attached to its respective chain stay 22 via the illustrated bolts 26 that pass through the vertical stay 16 of the frame member 14 and through the chain stay 22 of the velocipede 24 in the usual way, although the frame members 14 can be welded onto the velocipede 22 (if the frame members 14 are made from the appropriate material) for a more permanent attachment of the device 10 to the velocipede 24. A top plate 28 is attached to the horizontal stays 18 of the two frame members 14 in appropriate fashion. For added stability of the frame's attachment to the velocipede 24, the top plate 28 has an opening 30 through which the seat tube 32 of the velocipede 24 passes. Located on an upper surface of the top plate 28 can be various desired equipment such as the illustrated storage basket 34, lights 36, reflectors (not illustrated), etc.

A swinging frame member 38, which is substantially similar to the other two frame members 14 and also has a vertical stay 40 and a horizontal stay 42 joined by a diagonal brace 44, is hingedly attached to one of the first two frame members 14. Attachment is accomplished by first attaching an angle iron 46 to the vertical stay 16 of the frame member 14 to which the swinging frame member 38 is to be attached. The angle iron 46 is attached to the vertical stay 16 via the bolts 26 that attach the frame member 14 to the chain stay 22 with additional bolts 26 used at the upper end of the angle iron 36 and the vertical stay 16 of the frame member 14. Of course, the angle iron 46 can be welded to the frame member 14 or even formed integrally as the vertical stay 16 of the frame member 14, if desired. Hinges 48 are attached to angle iron 46 and to the vertical stay 40 of the swinging frame member 38. When hingedly attached to the angle iron 46, the swinging frame member 38 is located sufficiently close to the angle iron 46 so as to help prevent hinged rotation of the swinging frame member 38 much beyond 90 degrees with respect to the frame member 14 to which it is attached. Alternately, or in addition, appropriate stops (not illustrated) can be used to help prevent the beyond 90 degree rotation of the swinging frame member 38.

An attachment board 50 that has a first surface 52 and an opposing second surface 54 is provided such that the first surface 52 is attached to the swinging frame member 38 in any appropriate fashion. The attachment board 50 can be made from any appropriate material, however, use of a lightweight sturdy material, such as plastic, etc., is preferred. A kick stand 56 may be attached to a lower outer corner of the first surface 52 of the attachment board 50 (or to the swinging frame member 38 is the attachment board 50 is not used).

At least one, preferably two or more attachment straps 58 are attached to the attachment board 50 (or swinging frame member 38) in appropriate fashion, each strap 58 having an appropriate attachment mechanism 60 located on the ends thereof. The attachment mechanism 60 can be of any appropriate design known in the art including the illustrated cooperating hooks, a buckle system, cooperating hook and loop portions on the respective ends of the straps 58, etc., and can also include sizing means 62 to change the overall length of the straps 58.

A lock slide 64 is slidably disposed on the top tube 66 of the velocipede 24 such that a lock (not illustrated) frictionally holds the lock slide 64 securely in position on the top tube 66. Depression of a lock release 68 on the lock slide 64 releases the lock and allows the lock slide 64 to be able to slide up and down the top tube 66. Release of the lock release 68 once again locks the lock slide 64 and prevents further sliding along the top tube 66.

A control cord 70 (rope, cable, etc.,) is attached to the lock slide 64 and to the swinging frame member 38 proximate the joinder point of the vertical stay 40 and the horizontal stay 42 or to the attachment board 50. The cord control 70 passes over a first pulley 72 that is rotatably attached to the lower surface of the top plate 28 and optionally over a second pulley 74 that is impaled on the head tube 76, the use of the second pulley 74 giving a rider additional mechanical advantage when closing the swinging frame member 38 into its stowed position as more fully explained below.

A spring cord 78 (elastic, bungee, etc.,) has a first end attached to an appropriate point on the velocipede 24, such as to the top tube 66, the seat tube 32, etc., or to the top plate 28, and has an opposing second end that has an attachment hook 80 thereon which hooks onto one of the straps 58 or its attachment mechanism 60.

Figure 2:
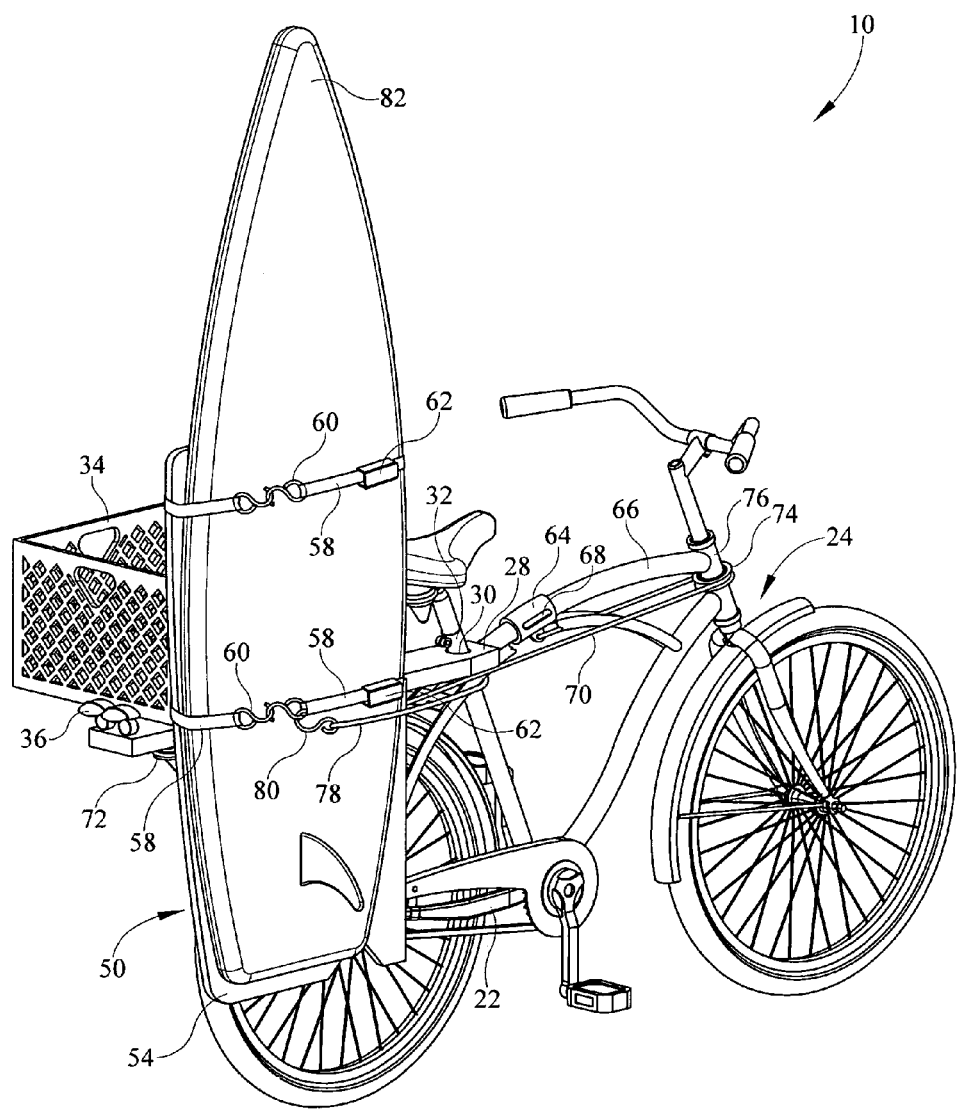
FIG. 2 is a perspective view of the wind sail system for a velocipede with the sail mechanism in a stowed configuration.
Figure 3:
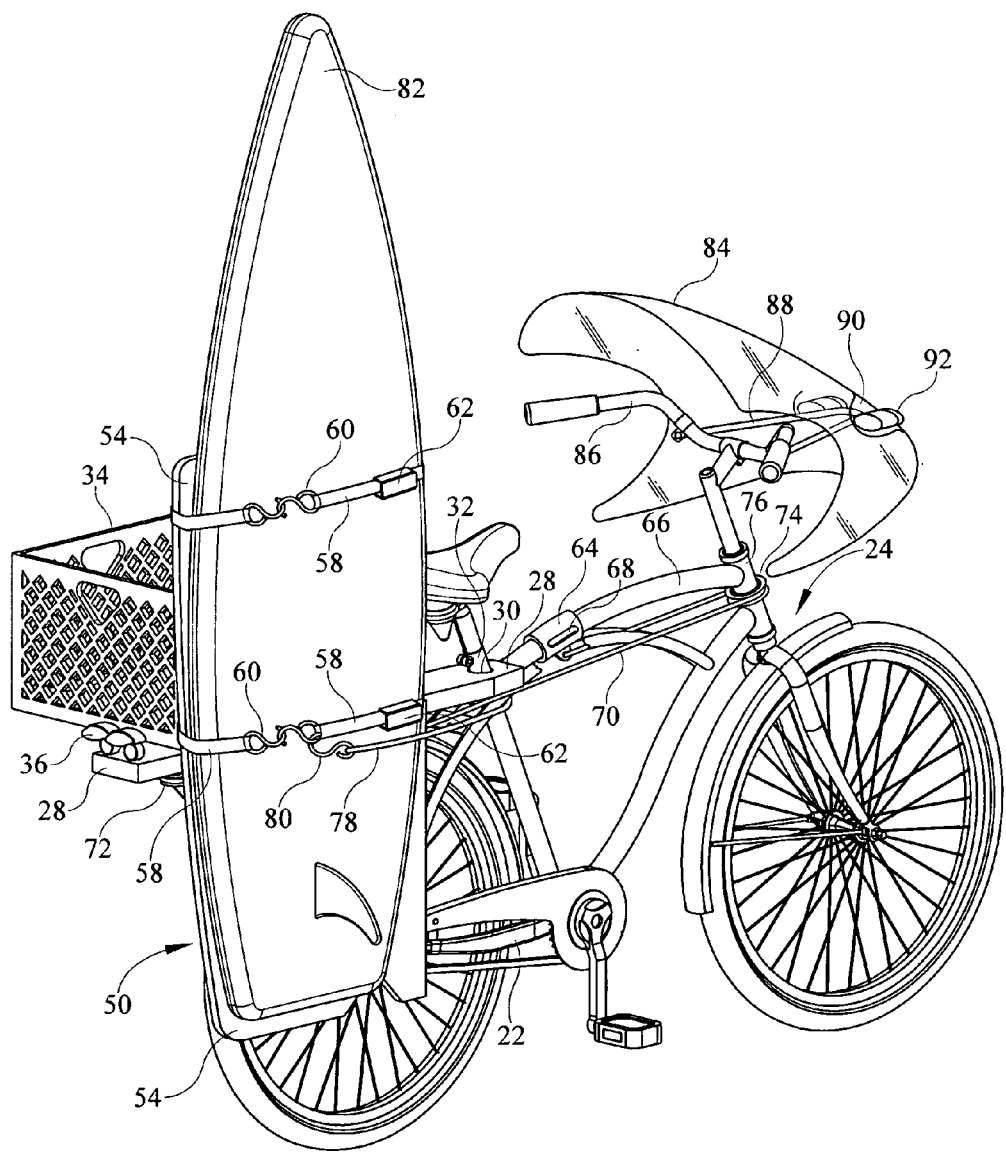
FIG. 3 is a perspective view of the wind sail system for a velocipede with the sail mechanism in the stowed configuration with an aerodynamic front shield attached to the velocipede.

In order to use the wind sail system for a velocipede 10 of the present invention a sport board 82 (illustrates surf board, body board, wake board, etc.,) is positioned onto the second surface 54 of the attachment board 50 (or directly to the swinging frame member 38 if the attachment board 50 is not used) and is secured thereto via the attachment straps 58. The attachment hook 80 of the spring cord 78 is hooked onto one of the straps 58 or their attachment mechanism 60 as appropriate. The swinging frame member 38 is placed into the closed position wherein the swinging frame member and its attached sport board 82 are essentially flush against the velocipede 24, as illustrated in FIGS. 2 and 3. In order to assure that the swinging frame member 38 is maintained in this closed position, the control cord 70 pulls onto the swinging frame member 38 and the cord 70 is made taut via the lock slide 64. In the configuration illustrated (with two pulleys 72 and 74), the lock slide 64 is pulled rearward toward the seat tube 32 away from the head tube 76. If a single pulley 72 configuration is used, that is the second pulley 74 is not used and the control cord 70 goes from the first pulley 72 directly to the lock slide 64, then the lock slide 64 is pulled forward toward the head tube 76 and away from the seat tube 32. The lock slide 64 is locked as described previously. When the rider desires to harness wind power, the swinging frame member 38 is released into an open position away from being flush with the velocipede 24 up to and including being essentially normal with the velocipede 24 as illustrated in FIG. 1. The wind loads onto the attachment board 50 (if used) and the attached sport board 82. To release the swinging frame member 38 from its closed position, the control cord 70 is positioned so as to be loose by the reverse process of making the control cord 70 taut as described above. Accordingly, in a two pulley 72 and 74 configuration, the lock slide 64 is pulled forward toward the head tube 76 and in a one pulley 72 configuration, the lock slide 64 is pulled toward the seat tube 32. With the control cord 70 loose and not holding the swinging frame member 38 in its closed position, the swinging frame member 38 is acted upon by the spring action of the spring cord 78, the spring cord 78 biasing the swinging frame member 38 into its open position. The use of the angle iron 46 assures there is sufficient clearance to allow the swinging frame member 38 and its attached attachment board 50 and sport board 82 to be able to swing back and forth without interference from the velocipede 24. The specific spring constant of the spring cord 78 is dependent on many factors including the size of the attachment board 50 and its anticipated sport board cargo 82, the overall length of the spring cord 78 and the location of the cord's attachment points. The rider controls the relative angle of the "sail" via the control cord 70 by either pulling the control cord 70 to make the cord 70 more taut thereby swinging the swinging frame member 38 toward (less sail) and ultimately into the closed position (no sail), or opening up the sail by making the control cord 70 more loose and letting the spring cord 78 swing the swinging frame member 38 toward and into its full open position. The spring cord 78 gives the sail, in its open position, some spring and resilience in changing wind loads. Of course the wind sail system for a velocipede 10 can be used without an attached sport board 82 with only the attachment board 50 acting as the main sail body. In such a configuration, the device 10 works as previously described with the wind acting on the attachment board 50 only. This still gives the velocipede 24 wind assisted locomotive power albeit less than with the sport board 82 attached under similar conditions. Furthermore, the wind sail system for a velocipede 10 can be used without the attachment board 50 so that the sport board 82 is attached directly to the swinging frame member 38.

In order to allow the velocipede 24 to travel even faster under a given set of conditions, an aerodynamic shield 84 is attached to the front of the velocipede 24 such as by attaching the shield 84 to the handle bars 86 via the illustrated attachment rods 88. As seen, the shield 84 has a pair of opposing detents 90 which each hold headlights 92.

While the invention has been particularly shown and described with reference to an embodiment thereof, it will be appreciated by those skilled in the art that various changes in form and detail may be made without departing from the spirit and scope of the invention.

I claim:

1. A sail system for a velocipede, the velocipede having a top tube, a head tube, a pair of chain stays, and a handle bar, the sail system comprising:
    a swinging frame member having a relatively flat attachment board attached thereto, the board member having a front surface and an opposing rear surface, the swinging frame member configured to be hingedly attached to the velocipede at an attachment point and capable of swinging between a closed position with the front surface essentially flush against the velocipede and an open position with the front surface oriented essentially normal to the velocipede;
    a first pulley configured to be attached to the velocipede rearward of the attachment point;
    a control cord having a first end attached to the swinging frame member or to the attachment board and having a second end, the control cord passing over the first pulley such that pulling on the second end of the control cord pulls the swinging frame member toward and ultimately into the closed position;
    a resilient spring cord having a first end attached to the swinging frame member or to the attachment board and a second end attached to the velocipede forward of the attachment point such that the spring cord biases the swinging frame member toward the open position; and
    a slide configured to be slidably disposed on a top tube of the velocipede and be capable of being frictionally held stationary on the top tube such that the second end of the control cord is attached to the slide.

2. The sail system as in claim 1 wherein the swinging frame member has an attachment strap thereon such that a sport board is configured to be attached to the swinging frame member and secured thereto via the attachment strap.

3. The sail system as in claim 1 further comprising a frame having a pair of attachment frame members, each attachment frame member configured to be attached to a respective one of the chains stays and the swinging frame member being attached to the velocipede via one of the attachment frame members, the frame also having a top plate onto which the first pulley is attached.

4. The sail system as in claim 1 further comprising a shield configured to be attached to the handle bar.

5. A sail system for a velocipede, the velocipede having a top tube, a head tube, a pair of chain stays, and a handle bar, the sail system comprising:
    a swinging frame member having a relatively flat attachment board attached thereto, the board member having a front surface and an opposing rear surface, the swinging frame member configured to be hingedly attached to the velocipede at an attachment point and capable of swinging between a closed position with the front surface essentially flush against the velocipede and an open position with the front surface oriented essentially normal to the velocipede;
    a first pulley configured to be attached to the velocipede rearward of the attachment point;
    a control cord having a first end attached to the swinging frame member or to the attachment board and having a second end, the control cord passing over the first pulley such that pulling on the second end of the control cord pulls the swinging frame member toward and ultimately into the closed position;
    a resilient spring cord having a first end attached to the swinging frame member or to the attachment board and a second end attached to the velocipede forward of the attachment point such that the spring cord biases the swinging frame member toward the open position; and
    a second pulley configured to be impaled by the head tube of the velocipede such that the control cord also passes over the second pulley.

6. The sail system as in claim 5 further comprising a slide configured to be slidably disposed on a top tube of the velocipede and be capable of being frictionally held stationary on the top tube such that the second end of the control cord is attached to the slide.

7. The sail system as in claim 6 wherein the swinging frame member has an attachment strap thereon such that a sport board is configured to be attached to the swinging frame member and secured thereto via the attachment strap.

8. The sail system as in claim 7 further comprising a frame having a pair of attachment frame members, each attachment frame member configured to be attached to a respective one of the chains stays and the swinging frame member being attached to the velocipede via one of the attachment frame members, the frame also having a top plate onto which the first pulley is attached.

9. The sail system as in claim 8 further comprising a shield configured to be attached to the handle bar.

10. A sail system for a velocipede, the velocipede having a top tube, a head tube, a pair of chain stays, and a handle bar, the sail system comprising:
    a swinging frame member having a relatively flat attachment board attached thereto, the board member having a front surface and an opposing rear surface, the swinging frame member configured to be hingedly attached to the velocipede at an attachment point and capable of swinging between a closed position with the front surface essentially flush against the velocipede and an open position with the front surface oriented essentially normal to the velocipede;

a first pulley configured to be attached to the velocipede rearward of the attachment point;

a control cord having a first end attached to the swinging frame member or to the attachment board and having a second end, the control cord passing over the first pulley such that pulling on the second end of the control cord pulls the swinging frame member toward and ultimately into the closed position;

a resilient spring cord having a first end attached to the swinging frame member or to the attachment board and a second end attached to the velocipede forward of the attachment point such that the spring cord biases the swinging frame member toward the open position; and a frame having a pair of attachment frame members, each attachment frame member attached to a respective one of the chains stays and the swinging frame member being attached to the velocipede via one of the attachment frame members, the frame also having a top plate onto which the first pulley is attached.

11. The sail system as in claim 10 further comprising a second pulley impaled by the head tube of the velocipede such that the control cord also passes over the second pulley.

12. The sail system as in claim 11 further comprising a slide slidably disposed on a top tube of the velocipede and capable of being frictionally held stationary on the top tube such that the second end of the control cord is attached to the slide.

13. The sail system as in claim 12 wherein the swinging frame member has an attachment strap thereon such that a sport board is configured to be attached to the swinging frame member and secured thereto via the attachment strap.

14. The sail system as in claim 13 further comprising a shield configured to be attached to the handle bar.

15. The sail system as in claim 10 wherein the swinging frame member has an attachment strap thereon such that a sport board is configured to be attached to the swinging frame member and secured thereto via the attachment strap.

16. The sail system as in claim 10 further comprising a shield configured to be attached to the handle bar.

* * * * *